April 11, 1967    W. P. JENSEN    3,313,631
APPARATUS FOR PRESERVING ANIMAL AND PLANT MATTER
Filed April 30, 1965
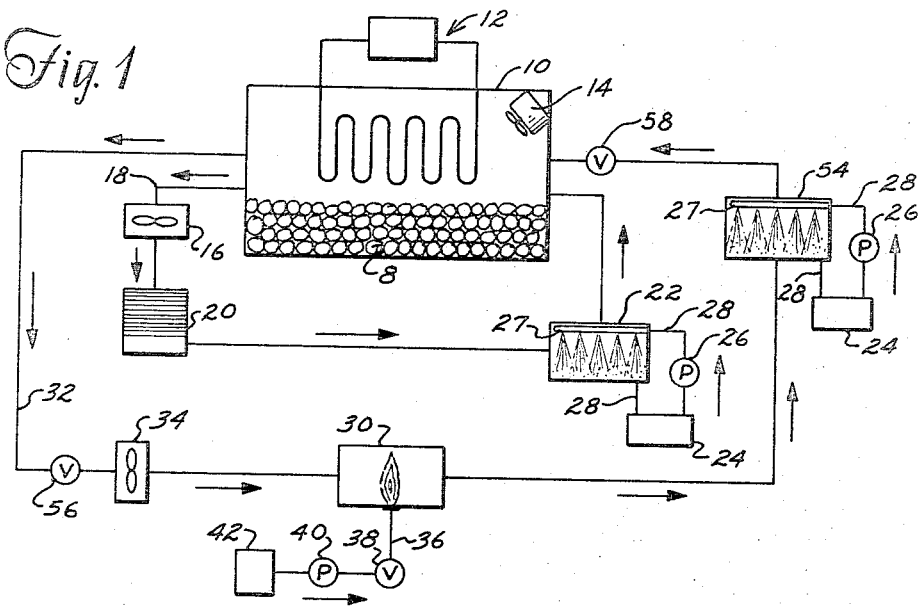
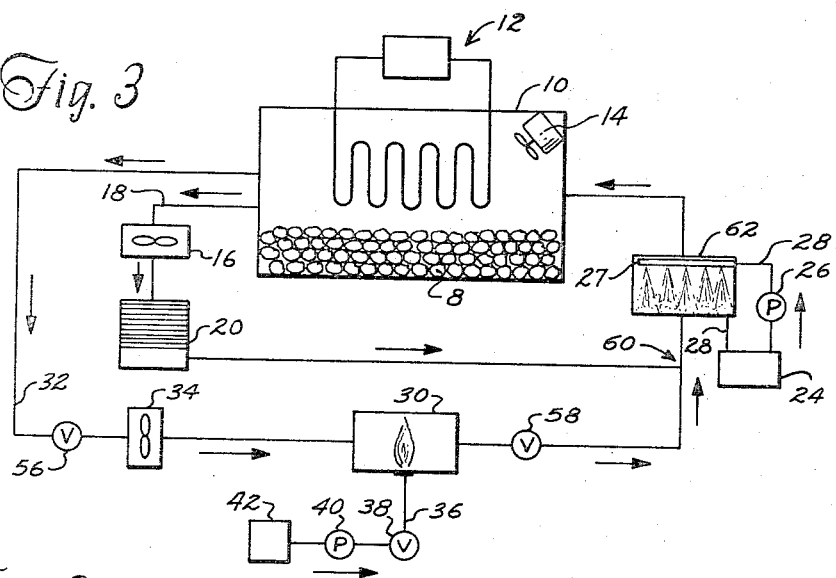
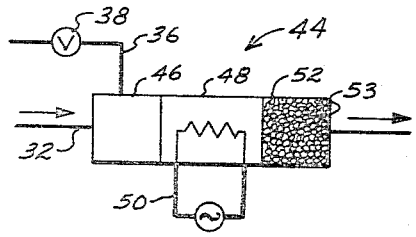
INVENTOR
WILLIAM PAUL JENSEN
BY
ATTORNEY 3,313,631
APPARATUS FOR PRESERVING ANIMAL AND
PLANT MATTER
William Paul Jensen, Springfield, Va., assignor to Atlantic Research Corporation, Fairfax County, Va., a corporation of Virginia
Filed Apr. 30, 1965, Ser. No. 452,235
3 Claims. (Cl. 99—271)

This invention relates to a process and apparatus for preserving animal and plant matter by means of retarding the rate of respiration of said matter.

The solution to the problem of storing perishable or oxidizable animal or plant matter for extended periods of time with limited physiological and micro-biological deterioration has long been unsatisfied. It is well known that both animal and plant matter, after being separated from their parent source, will continue their respiratory activities whereby oxygen is assimilated from the surrounding atmosphere and carbon dioxide and water vapor are emanated. It is also well known that both the reduction of available oxygen in the surrounding atmosphere and the flooding of the surrounding atmosphere with excessive carbon dioxide will retard or possibly terminate the respiratory activities of the stored matter. This would lead one to believe that by reducing the oxygen content or increasing the carbon dioxide content the storage problem is solved, and, in fact, many prior art devices have incorporated this principle in their operation.

One type of prior art storage means merely involves sealing off a storage chamber and relying upon the inherent respiratoary activity of the stored matter to reduce the oxygen content and increase the carbon dioxide content within the chamber. After a period of time, a quiescent or equilibrium state is attained whereby the carbon dioxide content is sufficiently high and the oxygen content sufficiently low to cause the respiratory activities to cease or, at least, slow down to a desirable rate. The major problem involved with this process is that the length of time required until equilibrium is reached, in most cases, is unacceptable, and furthermore, the deterioration of the matter stored within the chamber will have advanced to an undesirable state. Furthermore, sealing the storage chamber is very expensive and the stored matter remains inaccessible until it is desired to remove the matter because entering the storage chamber will admit fresh air and, thus, accelerate the respiration.

Another attempted solution has been to remove the air contained within the storage chamber and replace it with an inert gas such as nitrogen. This procedure, however, is quite expensive and also renders the storage chamber inaccessible during the storage period. Additionally, it is exceedingly difficult to satisfactorily remove the air within the chamber since the air is present in the innermost regions of the matter itself and, as such, resists the infiltration of inert gas therein.

More recent solutions include introducing a predetermined desired atmosphere into the storage chamber such as by burning a carbonaceous fuel in the presence of air to reduce the oxygen content and increase the carbon dioxide content of the air. The combustion products are then ducted directly into the storage chamber. Since it is undesirable to permit the atomsphere to remain stagnant within the storage chamber, a vent is usually provided for some dissipation of the storage atmosphere, the dissipated gases being replaced with fresh products of combustion. However, this open-circuit process requires that a combustion means be continually present to burn fresh air constantly or intermittently in order to provide the desired atmosphere. Furthermore, and of greater importance, the open-circuit system requires a considerable time period in order to provide the desired storage atmosphere or, in the alternative, it requires high capacity equipment. The former alternative is unacceptable for the reasons cited above and the latter alternative is economically inefficient since the high capacity is not needed to maintain the atmosphere but only to originally provide it.

Recent studies have indicated that the presence of a high concentration of carbon dioxide is undesirable. One reason is that it induces changes in the structure of the stored matter into a fibrous state. While still remaining usable, the product becomes undesirable since the texture or taste of the stored matter will vary from that of the natural state. Furthermore, it has been learned that by the elimination of carbon dioxide from the storage chamber the shelf life of the stored matter has increased considerably. Additionally, complete elimination of oxygen from the storage chamber will terminate the respiratory process and such termination is undesirable if "freshness" is to be retained. Therefore, it is apparent that the most desirable storage atmosphere contains a quantity of oxygen less than that normally found in air, for example, equal to or less than 5%, and other inert gases normally found in air and that it be essentially free of carbon dioxide and other products of respiration such as ethylene, aldehydes and ketones. This has led to a new class of apparatus for preserving animal and plant matter which includes filtering or purifying the atmosphere to remove carbon dioxide and other respiration products and cycling the purified atmosphere back into the storage chamber. To augment the oxygent removal, rather than rely upon the respiration of the stored matter to utilize the available oxygen, a combustion means or burner is usually included between the storage chamber and the purifying means such that the atmosphere removed from the storage chamber passes through the burner wherein the oxygen is converted into carbon dioxide and water vapor. The gaseous products then flow through the purifying means where the carbon dioxide, water vapor, and other respiration products are removed. The purified gas is then readmitted to the storage chamber. Because of the high temperature of the gas leaving the burner, it has been found necessary to provide a refrigeration source between the burner and the purifying means. The inclusion of this additional refrigeration apparatus increases the cost of the equipment and the operation of the process as well as providing an additional source of possible apparatus failure and process breakdown.

Accordingly, it is one object of the present invention to provide a process and apparatus for retarding the respiration rate of plant and animal matter which rapidly, efficiently, and relatively inexpensively, generates the desired storage atmosphere.

Another object of the present invention is to provide a process and apparatus for retarding the respiration rate of plant and animal matter which permits complete and continued accessibility of the storage chamber without detrimentally affecting the stored matter.

A still further object of the present invention is to provide a process and apparatus for retarding the respiration rate of plant and animal matter which rapidly and inexpensively provides an atmosphere which includes the desirable small quantity of oxygen and which is void of harmful respiration products.

Further objects and attendant advantages of the present invention will become better understood from the following description.

Briefly stated, this invention in one form provides a process and apparatus for carrying out the process for preserving animal and plant matter by retarding the respiration rate of such matter contained within a storage chamber. The retardation is effected by controlling the concentration of oxygen and respiration products in the atmosphere in which the matter is stored. This control is effected by continuously circulating the storage atmosphere through a closed circuit which includes a storage chamber, one or more blowers or pumps, gas purifying means, combustion means, and humidification means. A pair of conduits in parallel flow relationship are provided to interconnect the storage chamber and the gas purification means and combustion means, respectively. Conduits are provided downstream of the purification means and combustion means to combine the flow therefrom and direct the flow stream to the humidification means and back to the storage chamber. Conventional refrigeration apparatus is included within the storage chamber in order to maintain the temperature within the chamber at a constant value, the temperature depending upon the matter stored. The storage atmosphere initially is normal atmospheric air comprising approximately 79% nitrogen, 21% oxygen, .04% carbon dioxide, water vapor, and traces of inert gases.

In order to produce the desired storage atmosphere, the gas within the storage chamber is caused to flow and be acted upon as follows. A first portion of the storage atmosphere is passed through a gas purification means such as an adsorption unit wherein the carbon dioxide, water vapor, and other respiration products are removed thus producing a purified gas effluent consisting primarily of nitrogen, oxygen, and inert gases. A second portion of the storage atmosphere is passed through a combustion means such as a catalytic burner wherein an oxygen-combustible fuel is burned in the presence of the second portion of the storage atmosphere to convert a percentage of the oxygen into carbon dioxide and water vapor. The fuel-to-oxygen ratio is such that there will be substantially complete combustion of the fuel with a remaining excess of oxygen. The high temperature gaseous mixture or burner effluent, which includes nitrogen, carbon dioxide, water vapor, inert gases, and oxygen, the oxygen content being less than that normally found in air, is then combined with the purified gas effluent. The combined flow stream is passed through a humidifier to increase the relative humidity of the combined flow stream to within the range of 85% to 100% and also to cool the flow stream. The humidified gaseous mixture is introduced back into the storage chamber where it is further cooled by the refrigeration unit which normally serves the storage chamber. Because the volume of the gaseous mixture entering the storage chamber over a short time interval is small compared to the total volume of the storage atmosphere within the chamber, the over-all effect on the temperature of the storage atmosphere is small and can be easily handled by the refrigeration means, thus eliminating the need for additional refrigeration equipment. The introduction of carbon dioxide generated by the combustion means into the storage chamber is not harmful because a portion of the storage atmosphere is continuously circulated through the purification means and the carbon dioxide is removed rapidly thus having a relatively short storage chamber residence time. This dual circulation, i.e., through both the combustion means and the purification means, is continued until the oxygen content in the storage atmosphere is equal to a predetermined value at which time the flow through the combustion means is terminated resulting in flow only through the purification means and humidifier. The predetermined value of oxygen at which the termination of flow through the combustion means occurs is dependent upon the matter stored.

The invention will be better understood from the following description taken in combination with the accompanying drawing in which:

FIGURE 1 is a diagrammatic illustration and flow sheet of the apparatus and process formed in accordance with a first embodiment of the present invention, FIGURE 2 is a schematic illustration of a catalytic burner employed in the preferred form of the present invention, and FIGURE 3 is a diagrammatic illustration and flow sheet of the apparatus and process formed in accordance with a second embodiment of the present invention.

While it is to be understood that the apparatus and process which is the subject matter of this invention may be employed for preserving many species of animal and plant matter, the following detailed description will relate to the preservation of a particular plant matter. This permits greater detail in discussion and facilitates clearly describing the subject matter since it permits allusion to specific parameters and examples and should not be considered as limiting the scope of this invention.

Referring now more particularly to FIGURE 1 of the accompanying drawing, the produce 8 to be stored, for example, apples, is contained within a storage chamber 10 having suitable access passages (not shown) for loading, unloading, and inspecting the stored matter. The storage chamber 10 is refrigerated by any suitable conventional refrigeration means 12 in order to keep the atmospheric temperature in the chamber within the desired temperature range. This range is dependent upon the particular matter stored, for example, the range for storing apples is approximately 29–40° F. A gas circulation means or fan 14 is provided within the storage chamber 10 to circulate the storage atmosphere, thus facilitating refrigeration of the atmosphere and preventing stagnation of the layer of atmosphere immediately adjacent the stored products.

The storage atmosphere initially consists of normal atmospheric air comprising approximately 79% nitrogen, 21% oxygen, .04% carbon dioxide, traces of inert gases, and water vapor, the quantity of water vapor varying depending upon the relative humidity of the ambient air. It has been found that for maximum storage life and for the optimum quality of stored apples, the storage atmosphere oxygen content should be reduced to 2–5% within a relatively short period of time, for example, within 2–3 weeks. Several states designate an apple storage system which achieves this reduction in oxygen content in the stated time as "controlled atmosphere storage," which designation commands a premium in the market place. In order to attain the desired atmosphere within the optimum time period, the storage atmosphere is continuously circulated through the closed dual circuit described below which efficiently decreases the oxygen content, and removes harmful respiration products. In practice, the below-described system provides the desired atmosphere in a considerably shorter time, for example, one week or less.

A first portion of the atmosphere is continuously removed from the storage chamber 10 by any conventional pumping means 16. The pumping means 16 may take the form of an exhaust fan, a pump or any other gas-moving apparatus and may be located downstream of the storage chamber 10 as illustrated in FIGURE 1, or within the storage chamber 10 causing the storage atmosphere to flow out of the chamber and through the conduit 18. The first portion of the storage atmosphere extracted from the chamber 10 and passed through the conduit 18 is admitted to a purification means 20 for the removal of carbon dioxide, ethylene, and other respiration products or impurities. While it is not necessarily desirable to remove water vapor during the purification process, as a practical matter this usually results, thus producing a relatively dry purified gas comprising nitrogen, oxygen, and inert gases. While any type of gas purification means can be employed, the preferred form is a continuously operating adsorption means. The particular adsorbent utilized depends upon the matter stored and the particular gases required to be removed. For example, when the stored matter is apples and it is necessary to remove carbon dioxide, ethylene, aldehydes and ketones, a suitable adsorbent is synthetic zeolite which can be regenerated by the application of heat. Another usable, albeit less efficient, purification means is a conventional absorption device such as a water scrubber.

One of the parameters for proper storage atmosphere is high relative humidity, in the order of 85–100%. Because the purification unit 20 removes water vapor as part of its purification process, it is necessary to humidify the purified effluent. Humidification may be accomplished by any conventional humidifier 22 prior to admission into the storage chamber 10, or the humidification may be done inside the storage chamber during the refrigeration process. Since it is desirable to leave the storage chamber 10 closed as much as possible, it is advisable to locate the humidifier 22 external to the storage chamber. Humidifiers need some degree of maintenance and locating it external to the storage chamber 10 permits such without disturbing the storage atmosphere. A typical humidifier, schematically illustrated in FIGURE 1, includes a reservoir 24, a pump 26, a spray 27, and appropriate conduits 28 to lead the water from the reservoir 24 to the spray 27 and to drain the water back to the reservoir 24. The humidified gaseous mixture leaving the humidifier 22 is then admitted back into the storage chamber 20 in order to modify and help constitute the storage atmosphere and to be refrigerated.

The purification process just described is a closed-circuit process in which a portion of the atmosphere in the storage chamber is passed through the purification unit 20, the humidifier 22, and admitted back into the storage chamber 10.

The purification process described above has no positive means for removing or reducing the oxygen level of the storage atmosphere, and the reduction of the oxygen level is solely dependent upon the respiration rate of the stored matter, or apples 8. In order to accelerate the removal or reduction of oxygen in the storage atmosphere a combustion or burning means 30 is employed. A second portion of the storage atmosphere is caused to flow in parallel flow relationship with the first portion of the storage atmosphere referred to above by means of a conduit 32 which directs the second portion of the atmosphere to the burning means 30. A blower or pump 34 may be included in the conduit line, in the storage chamber 10, or be formed as part of the burner 30 in order to effect the desired flow rate of storage atmosphere to the burner 30. The burner 30 employs an oxygen-combustible fuel for converting the oxygen in the storage atmosphere into another form easily removed by the purification means 20. Fuels, such as hydrogen, alkanes of up to 5 carbon atoms, and mixtures thereof can be employed. Propane is a preferred fuel since it is inexpensive and most easily handled, however, other mixtures such as natural gas, water gas, and liquified petroleum gas (LPG) have been found to be suitable. Because it is desirable to maintain some oxygen in the resultant storage atmosphere the fuel is admitted in a less-than-stoichiometric quantity through a fuel feeding circuit including a fuel line 36, a fuel control valve 38, a pump 40, and a reservoir 42. This will ensure substantially complete combustion of the fuel in the presence of the second portion of the storage atmosphere without removing the entire quantity of oxygen. When a hydrocarbon fuel is used, the resultant gaseous mixture includes nitrogen, carbon dioxide, water vapor, and oxygen. While the eventual goal is to provide a storage atmosphere having an oxygen content of predetermined value, for example, 2–5%, it is not necessary that this content be reached immediately, that is, during the first cycle of the storage atmosphere through the burner 30. Accordingly, it is not necessary that the gaseous mixture or effluent leaving the burner 30 contains oxygen in the predetermined final desired amount. The effluent initially leaving the burner 30 may include oxygen having a higher than desired quantity, however, after several passes through the circuit the oxygen content will be lowered to the desired level.

A preferred form of burner 30 is a catalytic burner 44, an example of which is schematically illustrated in FIGURE 2. The catalytic burner 44 includes a mixing zone 46 where the incoming storage atmosphere is mixed with the fuel. The fuel-atmosphere mixture is preheated in the heating zone 48 by an electrical resistance heater 50 and burning takes place in a catalyst chamber 52. Platinum-coated pellets 53 have been found to be very effective as the catalyst.

The primary advantage of using a catalytic burner 44, as contrasted with a conventional flame burner, is the lower oxygen concentration required. Flame conversion requires a fairly high initial oxygen concentration, i.e., at least about 13%. Since it is desirable to bring the oxygen content down to about 5% or less, conventional flame conversion would be required to drop the oxygen concentration in the atmosphere from 13% or more down to the desired level in one pass. Since there is a constant intermixing of the storage atmosphere with the burner effluent, the oxygen concentration begins to decrease almost immediately upon start-up making practical application of this very unlikely. Furthermore, this requires a high capacity burner producing a very high temperature effluent, placing a heavy load on the refrigeration means 12. Catalytic burners, however, effectively chemically combine oxygen and the oxidizable portion of the fuel even at very low oxygen concentration levels. This permits recirculation of the storage atmosphere many times through the burner and permits gradual reduction in the oxygen concentration thus providing the net result of a high capacity, once-through system with the use of a much smaller, less expensive burner. Another advantage of catalytic burners is the low temperature of the combustion products as compared with that of a flame burner. By keeping the temperature of the combustion products relatively low, the refrigeration system in the storage chamber is not overloaded.

The effluent leaving the burner 30 may then be directed back to the storage chamber 10 where it will intermix with the storage atmosphere and be refrigerated by the refrigeration unit 12. However, because of the relatively high temperature of the effluent and its low relative humidity, it is preferable to pass the effluent through a humidifier 54 which is essentially the same as humidifier 22 described above. The humidifier 54 reduces the temperature of the effluent sufficiently so as to avoid overloading the refrigeration unit 12, or, alternatively, to permit use of a lower capacity refrigeration unit.

The burning process just described involves a closed-circuit process in which a portion of the atmosphere from the storage chamber is passed through a burner, a humidifier, and is then admitted back into the storage chamber 10. Combining the burning closed-circuit process with the purification closed-circuit process described above brings the carbon dioxide and oxygen content within the desired range in a reasonably short time period. The time required is controlled by the capacity of the purification unit 20 and by the quantity of fuel burned in the presence of the second portion of the stored atmosphere. As mentioned above, it is mandatory that not all the oxygen be removed from the storage atmosphere. Therefore, after the oxygen has been reduced to the desired range, it is necessary to eliminate the burning portion of the over-all process leaving only the purification process in operation. Conventional valve means 56, 58 are provided on the upstream and downstream sides of the burner 30, respectively, in order to eliminate the burner 30 from the over-all process. The burner 30, with or without the humidifier 54, may be removed from the circuit and utilized elsewhere or other storage units (not shown) may be connected to the burner circuit in order to make maximum use of the burner since its use in each of the cycles will be needed for only a relatively short period.

The over-all process described above with reference to FIGURE 1 employs two completely parallel circuits, a first circuit for purifying a first portiton of the storage atmosphere and a second circuit for removing oxygen from a second portion of the storage atmosphere through combustion. It is obvious that when the first and second portions re-enter the storage chamber they are intermixed with the storage atmosphere contained therein. This intermixing permits the purifier 20 to eventually act upon the burner effluent and permits the burner 30 to eventually act upon the purifier effluent.

FIGURE 3 illustrates a second embodiment or modification of the above-described process by combining the effluent from the purifier 20 and burner 30 into a single flow stream as shown at 60. The combined flow stream is then caused to pass through a humidifier 62 from which it re-enters the storage chamber 10. All other aspects of the over-all process are identical to that described above.

The arrangement of the apparatus as described above eliminates the need for an additional refrigeration unit between the burner 30 and the purification means 20 since the high temperature burner effluent, prior to entering the purification means 20, passes through the storage chamber 10, which, by necessity, includes a refrigeration unit 12. Additionally, the effluent leaving the burner 30 passes through a humidifier which also reduces its temperature. This invention also permits complete inaccessibility to the storage chamber 10 since any increase in the oxygen level, such as that caused by one entering the chamber to either inspect, remove, or add matter for storage, may be removed in a short period of time. The arrangement also permits maximum use of the burner for one or more storage units.

It, therefore, is obvious that through this invention maximum utilization of the several individual operating units has been made and, in so doing, an efficient and inexpensive cycle is provided for the preservation of animal and plant matter. Furthermore, by using a closed cycle, continuously circulating system, the required capacity of the apparatus is substantially reduced relative to current systems and the time required to obtain the desired atmosphere is similarly reduced.

What I claim as new and desire to be secured by Letters Patent of the United States is:

1. Apparatus for retarding the respiration rate of and preserving animal and plant matter, said apparatus, intended for use with a normally closed, refrigerated storage chamber having said matter therein, and including:
    (a) purification means for removing carbon dioxide and other respiration products of said matter from a first portion of the storage atmosphere in which said matter is maintained to provide a purified atmosphere portion consisting essentially of nitrogen and oxygen,
    (b) oxidation means for providing a less-than-stoichiometric quantity of oxygen-combustible fuel to effect substantially complete combustion of said fuel in the presence of a second portion of said storage atmosphere to thereby reduce the oxygen content of said second atmosphere portion and to provide a gaseous mixture including nitrogen, oxygen and water vapor,
    (c) first closed circuit circulating means connected to said storage chamber and said purification means for causing said first atmosphere portion to sequentially flow from said storage chamber to said purification means and back to said storage chamber, and
    (d) second closed circuit circulating means connected to said storage chamber and said oxidation means for causing said second atmosphere portion to sequentially flow from said storage chamber to said oxidation means and back to said storage chamber to ultimately provide a storage atmosphere having a predetermined oxygen content lower than that normally found in atmospheric air, said oxygen content being determined by the specific type of matter being stored in said chamber.

2. The apparatus as defined in claim 1 including humidification means connected to said first and second circulating means for humidifying said purified first portion from said purification means and said gaseous mixture from said oxidation means.

3. The apparatus as defined in claim 1 including valve means in said second circulating means to terminate flow through said oxidation means when said predetermined oxygen content is provided in said storage atmosphere.

References Cited by the Examiner

UNITED STATES PATENTS

| | | | |
|---|---|---|---|
| 2,309,007 | 1/1943 | Parsons. | |
| 2,789,059 | 4/1957 | Lindewald | 99—189 |
| 2,923,629 | 2/1960 | Bonomi | 99—154 X |
| 2,955,940 | 10/1960 | Williams | 99—154 |
| 3,102,777 | 9/1963 | Bedrosian et al. | 99—154 X |
| 3,102,778 | 9/1963 | Bedrosian et al. | 99—154 X |
| 3,102,779 | 9/1963 | Brody et al. | 99—154 X |
| 3,102,780 | 9/1963 | Bedrosian et al. | 99—154 X |
| 3,107,171 | 10/1963 | Robinson | 99—154 |

FOREIGN PATENTS 457,888  12/1936  Great Britain.

A. LOUIS MONACELL, *Primary Examiner.*

HYMAN LORD, *Examiner.*